(12) United States Patent
Bell et al.

(10) Patent No.: US 11,789,810 B2
(45) Date of Patent: *Oct. 17, 2023

(54) METHOD AND SYSTEM FOR DETECTING DATA CORRUPTION

(71) Applicant: The Toronto-Dominion Bank, Toronto (CA)

(72) Inventors: Kathleen Bell, Ottawa (CA); Tyler Austin Neil, Ottawa (CA); Michael James Taggart, Ottawa (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,606

(22) Filed: Jul. 14, 2022

(65) Prior Publication Data

US 2022/0350695 A1 Nov. 3, 2022

Related U.S. Application Data

(63) Continuation of application No. 17/143,234, filed on Jan. 7, 2021, now Pat. No. 11,429,476.

(51) Int. Cl.
*G06F 11/00* (2006.01)
*G06F 11/07* (2006.01)
*G06F 16/23* (2019.01)

(52) U.S. Cl.
CPC ...... *G06F 11/0793* (2013.01); *G06F 11/0709* (2013.01); *G06F 11/0751* (2013.01); *G06F 16/2365* (2019.01)

(58) Field of Classification Search
CPC ............ G06F 11/0793; G06F 11/0709; G06F 11/0751; G06F 16/2365
See application file for complete search history.

(56) References Cited

U.S. PATENT DOCUMENTS

| | | | |
|---|---|---|---|
| 5,659,165 A | 8/1997 | Jennings et al. | |
| 7,636,874 B2 | 12/2009 | Gutbrod et al. | |
| 8,069,113 B2 | 11/2011 | Elterich | |
| 8,560,439 B2 | 10/2013 | Hahn-Carlson | |
| 10,074,091 B2 | 9/2018 | Crawford | |
| 11,429,476 B2 * | 8/2022 | Bell | G06F 16/2365 |
| 2009/0070241 A1 | 3/2009 | Manohar | |
| 2011/0282780 A1 | 11/2011 | French et al. | |
| 2014/0279526 A1 | 9/2014 | Jackson | |
| 2014/0279540 A1 | 9/2014 | Jackson | |

(Continued)

FOREIGN PATENT DOCUMENTS

| | | |
|---|---|---|
| WO | 2008011102 | 1/2008 |
| WO | 2014143720 | 9/2014 |

*Primary Examiner* — Philip Guyton
(74) *Attorney, Agent, or Firm* — Rowand LLP (57) ABSTRACT

A system, comprises at least one processor; and a memory coupled to the at least one processor and storing a function-performing module comprising processor-executable instructions which, when executed by the at least one processor, configure the at least one processor to determine that a function performed by a function-performing module was not performed according to a defined rule; and responsive to determining that the function was not performed according to the defined rule, generate a notification indicating data corruption, the data corruption detection module and the function-performing module configured separately and in a blind manner.

20 Claims, 3 Drawing Sheets

(56) References Cited

U.S. PATENT DOCUMENTS

2015/0294413 A1 10/2015 Jonas et al.
2017/0147630 A1 5/2017 Scott et al.
2020/0151810 A1 5/2020 Gruhl et al.
2020/0211045 A1 7/2020 Tanaka

* cited by examiner

METHOD AND SYSTEM FOR DETECTING DATA CORRUPTION

CROSS-REFERENCE TO RELATED APPLICATIONS

This application is a continuation of U.S. patent application Ser. No. 17/143,234, filed on Jan. 7, 2021, the entire contents of which are incorporated herein by reference.

TECHNICAL FIELD

The present application relates to methods and systems for detecting data corruption.

BACKGROUND

Computer program code, when executed by a processor, may configure the processor to perform one or more functions. Data corruption in computer program code may result in the one or more functions being performed in error.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In one or more embodiments, a system may comprise at least one processor; and a memory coupled to the at least one processor and storing a function-performing module comprising processor-executable instructions which, when executed by the at least one processor, configure the at least one processor to perform a function associated with a data record; a data corruption detection module comprising processor-executable instructions which, when executed by the at least one processor, configure the at least one processor to determine whether the function performed in association with the data record was performed according to a defined rule; and responsive to determining that the function was not performed according to the defined rule, generate a notification indicating data corruption and identifying the data record.

In one or more embodiments, the data corruption indicates an error in the processor-executable instructions of the function-performing module.

In one or more embodiments, the data record is associated with one or more defined rules, the one or more defined rules including the defined rule.

In one or more embodiments, the one or more defined rules are defined during a data record configuration process.

In one or more embodiments, the function associated with the data record includes adjusting a value of the data record.

In one or more embodiments, the data corruption detection module further comprises processor-executable instructions which, when executed by the at least one processor, further configure the at least one processor to responsive to determining that the function was not performed according to the defined rule, adjust the value of the data record by an amount equal to an amount adjusted by the function-performing module.

In one or more embodiments, the defined rule includes applying an input/output modifier to the value of the data record.

In one or more embodiments, the function associated with the data record includes generating a statement listing one or more other functions performed on the data record and sending the statement to a user associated with the data record.

In one or more embodiments, the processor-executable instructions of the function-performing module are executed by a first processor of a first server computer system and the processor-executable instructions of the data corruption detection module are executed by a second processor of a second server computer system.

In one or more embodiments, the data corruption detection module further comprises processor-executable instructions which, when executed by the at least one processor, further configure the at least one processor to identify a rule based on the function performed in associated with the data record; wherein determining that the function was not performed according to the defined rule includes determining that the identified rule is not one of one or more defined rules associated with the data record.

In another aspect, a computer-implemented method may comprise performing, via a function-performing module, a function associated with a data record; determining, via a data corruption detection module, whether the function performed in association with the data record was performed according to a defined rule; and responsive to determining that the function was not performed according to the defined rule, generating, via the data corruption detection module, a notification indicating data corruption and identifying the data record.

In one or more embodiments, the data corruption indicates an error in processor-executable instructions of the function-performing module.

In one or more embodiments, the data record is associated with one or more defined rules, the one or more defined rules including the defined rule.

In one or more embodiments, the one or more defined rules are defined during a data record configuration process.

In one or more embodiments, the function associated with the data record includes adjusting a value of the data record.

In one or more embodiments, the computer-implemented method further comprises responsive to determining that the function was not performed according to the defined rule, adjusting, via the data corruption detection module, the value of the data record by an amount equal to an amount adjusted by the function-performing module.

In one or more embodiments, the defined rule includes applying an input/output modifier to the value of the data record.

In one or more embodiments, the function associated with the data record includes generating a statement listing one or more other functions performed on the data record and sending the statement to a user associated with the data record.

In one or more embodiments, the computer-implemented method further comprises identifying, via the data corruption detection module, a rule based on the function performed in associated with the data record; wherein determining that the function was not performed according to the defined rule includes determining, via the data corruption detection module, that the identified rule is not one of one or more defined rules associated with the data record.

In another aspect, at least one non-transitory computer readable storage medium comprising processor-executable instructions which, when executed, configure one or more processors to perform, via a function-performing module, a function associated with a data record; determine, via a data corruption detection module, whether the function performed in association with the data record was performed according to a defined rule; and responsive to determining that the function was not performed according to the defined rule, generate, via the data corruption detection module, a notification indicating data corruption and identifying the data record.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
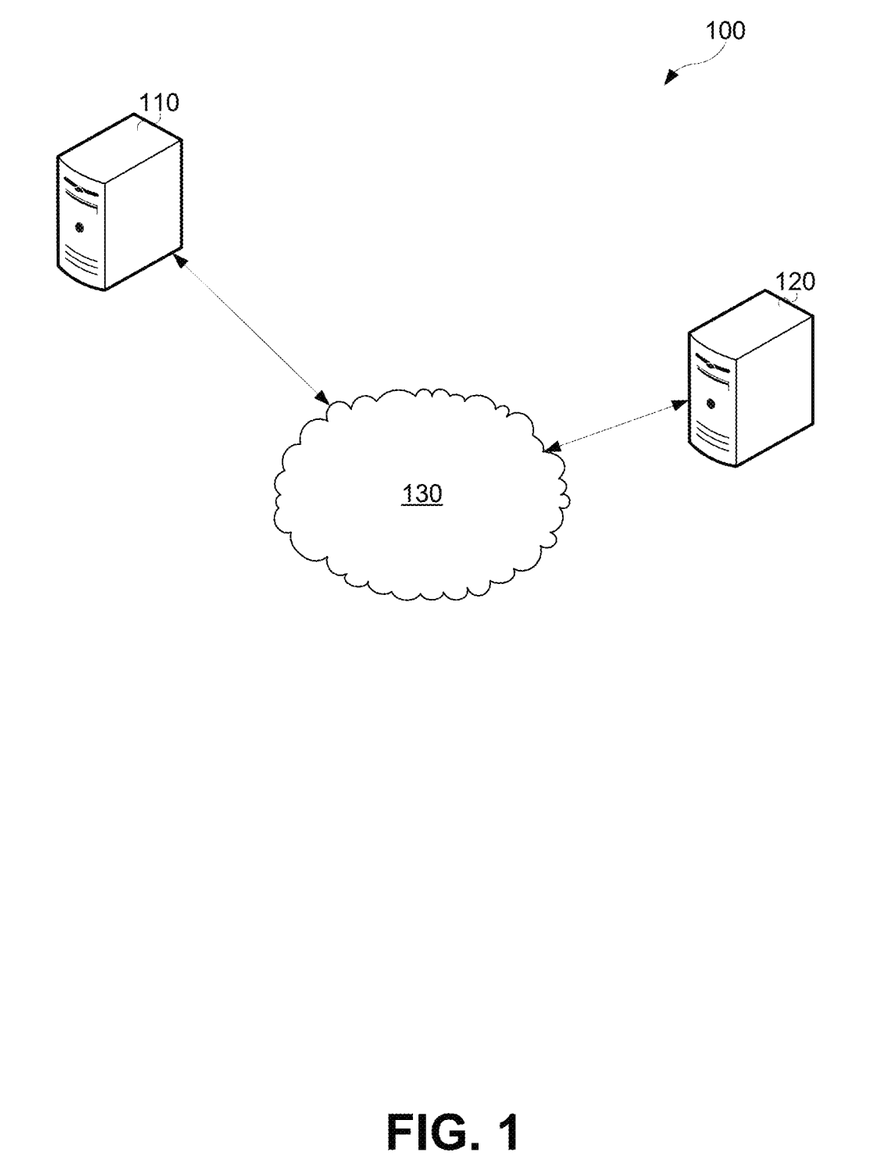
FIG. 1 is a schematic operation diagram illustrating an operating environment of an example embodiment.

FIG. 1 is a block diagram illustrating an operating environment of an example embodiment. Various components cooperate to provide a system 100 which may be used, for example, for performing functions on data records and for detecting data corruption. As shown, the system 100 includes a first server computer system 110 and a second server computer system 120 coupled to one another through a network 130, which may include a public network such as the Internet and/or a private network.

The first server computer system 110 may maintain a database that includes various data records. For example, the first server computer system 110 may be a financial institution server which may maintain customer bank accounts. In this example, a data record may, for example, reflect an amount of value stored in a particular account associated with a user. As will be described in more detail below, the data records may be associated with one or more defined rules. The first server computer system 110 may include a function-performing module comprising processor-executable instructions that, when executed by a processor, configure the processor to perform one or more functions associated with one or more data records. The one or more functions may be performed according to the defined rules.

The second server computer system 120 may include a data corruption detection module comprising processor-executable instructions that, when executed by a processor, configure the processor to determine whether functions performed on data records were performed according to defined rules. Put another way, the data corruption detection module may identify one or more functions performed by the function-performing module of the first server computer system 110 in association with one or more data records and may determine that the one or more functions were not performed according to defined rules. As a result, the data corruption detection module may generate a notification indicating data corruption and may identify the one or more data records that were affected by the data corruption. The data corruption may be, for example, the result of one or more errors in the processor-executable instructions of the function-performing module of the first server computer system 110. The data corruption may additionally or alternatively be the result of a computer virus and/or hardware issues. Data corruption may additionally or alternatively indicate that the processor-executable instructions of the function-performing module have been compromised, tampered with or otherwise corrupted.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The first server computer system 110 and the second server computer system 120 may be in geographically disparate locations. Put differently, the first server computer system 110 and the second server computer system 120 may be remote from one another.

FIG. 1 illustrates an example representation of components of the system 100. The system 100 can, however, be implemented differently than the example of FIG. 1. For example, the data corruption detection module and the function-performing module may be implemented on a single server computer system. When implemented on a single server computer system, the data corruption detection module and the function-performing module are separate modules, as will be described in more detail below.

Figure 2:
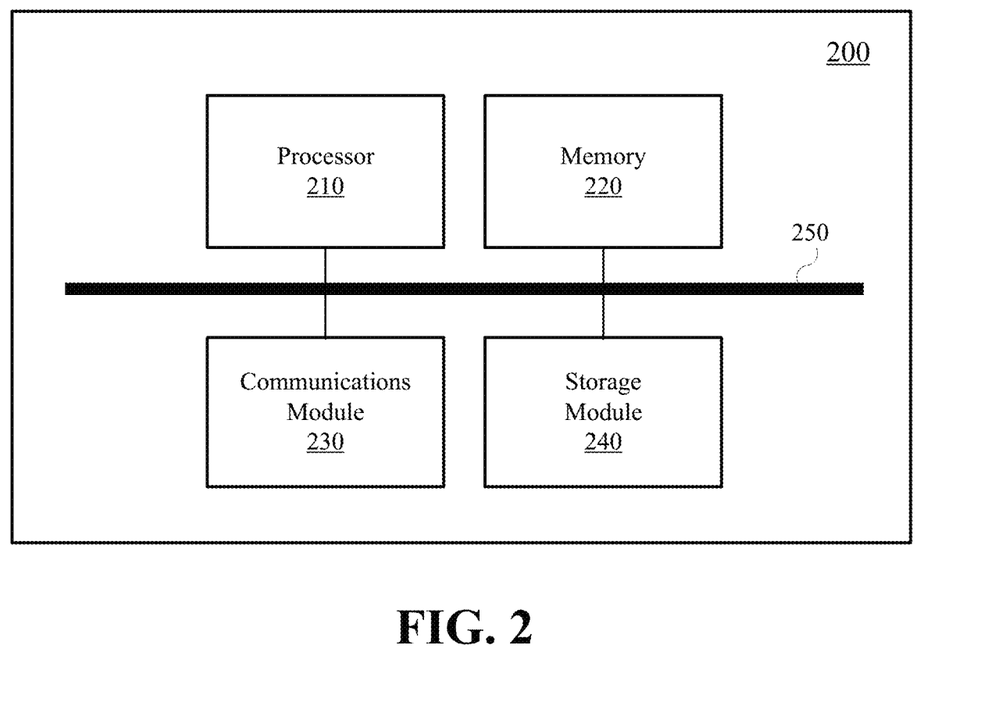
FIG. 2 is a high-level schematic diagram of an example computer device.

The first server computer system 110 and the second server computer system 120 are computer devices. Referring now to FIG. 2, a high-level operation diagram of an example computer device 200 is shown. In some embodiments, the computer device 200 may be exemplary of the first server computer system 110 and/or the second server computer system 120.

The example computer device 200 includes a variety of modules. For example, as illustrated, the example computer device 200 may include a processor 210, a memory 220, a communications module 230, and/or a storage module 240. As illustrated, the foregoing example modules of the example computer device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory processor-readable storage medium. A processor-readable medium may be organized using a file system such as may be administered by an operating system governing overall operation of the example computer device 200.

The communications module 230 allows the example computer device 200 to communicate with other computer or computing devices and/or various communications networks. For example, the communications module 230 may allow the example computer device 200 to send or receive communications signals. Communications signals may be sent or received according to one or more protocols or according to one or more standards. For example, the communications module 230 may allow the example computer device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computer device 200 to communicate using near-field communication (NFC), via Wi-Fi™, using Bluetooth™ or via some combination of one or more networks or protocols. In some embodiments, all or a portion of the communications module 230 may be integrated into a component of the example computer device 200. For example, the communications module may be integrated into a communications chipset. In some embodiments, the communications module 230 may be omitted such as, for example, if sending and receiving communications is not required in a particular application.

The storage module 240 allows the example computer device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a processor-readable medium. For example, software may be loaded into random-access memory from persistent storage of the memory 220. Additionally or alternatively, instructions may be executed by the processor 210 directly from read-only memory of the memory 220.

Figure 3:
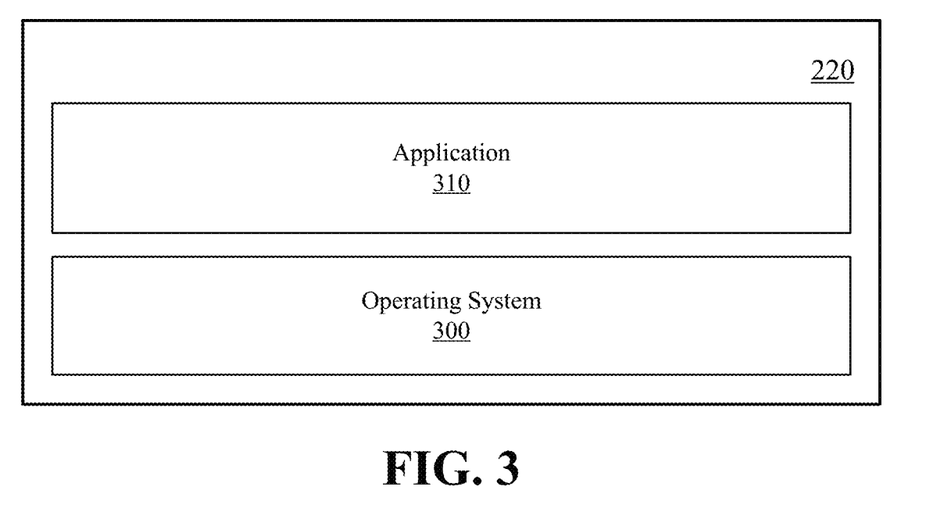
FIG. 3 shows a simplified organization of software components stored in a memory of the example computer device of FIG. 2.

FIG. 3 depicts a simplified organization of software components stored in the memory 220 of the example computer device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computer device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computer device 200, in combination with the operating system 300, to operate as a device performing a particular function. For example, the application 310 may cooperate with the operating system 300 to adapt a suitable embodiment of the example computer device 200 to operate as the first server computer system 110 and/or the second server computer system 120.

While a single application 310 is illustrated in FIG. 2, in operation the memory 220 may include more than one application 310 and different applications 310 may perform different operations.

As mentioned, the data corruption detection module and the function-performing module are separate modules. The processor-executable instructions of the data corruption detection module and the processor-executable instructions of the function-performing module are configured separately and in a blind manner such that configuration of the processor-executable instructions of the data corruption detection module is done without knowledge of the processor-executable instructions of the function-performing module, and vice versa. For example, the processor-executable instructions of the data corruption detection module may be configured or otherwise coded by a first group and the processor-executable instructions of the function-performing module may be configured or otherwise coded by a second group, the first and second groups not having access to the other group's module. In this manner, the data corruption detection module is configured to check or otherwise determine whether or not the function-performing module is operating as it should. Put another way, the system 100 may be configured to perform functions on data records and to detect data corruption associated with the performed functions.

Figure 4:
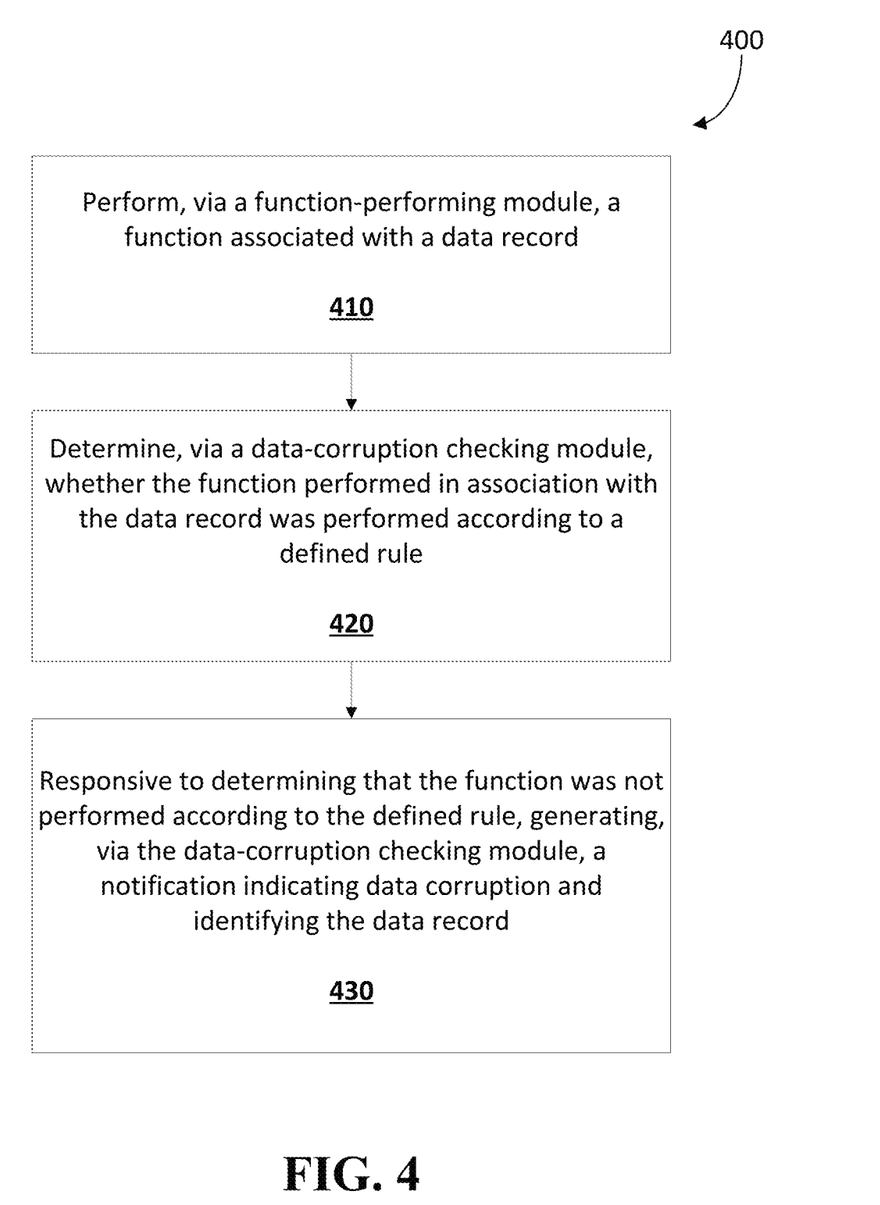
FIG. 4 is flowchart showing operations performed by a system in detecting data corruption according to an embodiment.

FIG. 4 is a flowchart showing operations performed by the system 100 in detecting data corruption according to an embodiment. The operations may be included in a method 400 which may be performed by the system 100. For example, processor-executable instructions stored in memory of the first server computer system 110 and the second server computer system 120 may, when executed by one or more processors, configure the system 100 to perform the method 400 or a portion thereof.

The system 100 performs a function associated with a data record (step 410). The first server computer system 110 includes a function-performing module comprising processor-executable instructions that, when executed by a processor of the first server computer system 110, configure the processor to perform one or more functions on one or more data records. The one or more functions may be performed according to defined rules.

As mentioned, the first server computer system 110 may be a financial institution server and as such a data record may, for example, reflect an amount of value stored in a particular account associated with a user. The data record may be associated with one or more defined rules. The one or more defined rules may include one or more rules defining an input/output modifier to be applied to the value of the data record. The input-output modifier may be based on, for example, a fee, an exchange rate, interest, and/or a transfer. The one or more defined rules may additionally or alternatively include one or more rules defining whether or not a statement is to be generated for a data record. A statement may be, for example, a listing of one or more other functions performed on the data record. The statement may be a paper statement sent to the user through, for example, standard mail or may be an electronic statement sent to the user through, for example, electronic mail.

The one or more defined rules may include a frequency to which other defined rules may be applied. For example, the one or more defined rules may include applying a monthly fee for one or more data records. The monthly fee may be a monthly fee of a bank account. As another example, the one or more defined rules may include generating a monthly statement for a data record.

The one or more defined rules may be defined during a data record configuration process. For example, when a data record is to be generated for a user, one or more rules may be defined for that data record. The defined rules may be adjusted or updated by an administrator associated with the financial institution or may be adjusted or updated by the user through, for example, a mobile banking website hosted by the first server computer system 110. As an example, the user may use a mobile device to log into a mobile banking account associated with their account. The mobile banking account may include a user interface including one or more rules to be applied to the data record associated with the user. The one or more rules may be selected or de-selected by the user.

The one or more defined rules may be implemented by the first server computer system 110 by way of processor-executable instructions. For example, the function-performing module of the first server computer system 110 may include processor-executable instructions that, when executed by a processor of the first server computer system 110, configure the processor to perform a function associated with a data record. The processor-executable instructions may include computer program code.

The functions performed by the function-performing module are based on the one or more defined rules. The functions may include applying an input/output modifier to a value of the data record, generating a statement for the account, generating a notification, etc. For example, a function may include adjusting a value of a data record and this may be based on a defined rule defining an input/output modifier and a frequency. As another example, a defined rule may be associated with a monthly fee and the function performed by the function-performing module may include charging the monthly fee by adjusting the value of the data record by a particular amount.

One or more functions performed by the function-performing module may be performed in error. For example, data corruption in the processor-executable instructions of the function-performing module may configure the processor to perform a function on a data record that is not according to a defined rule associated with the data record. The data corruption may be caused by, for example, an error in the processor-executable instructions of the function-performing module. The error may be the result of a coding error. The error may additionally or alternatively be the result of a computer virus or may indicate that the processor-executable instructions have been compromised, tampered with or otherwise corrupted.

When a function performed on a data record is performed in error, it may go undetected. For example, the value of a data record may be adjusted by a particular amount when, for example, one or more defined rules associated with the data record may indicate that the value of the data record is to be adjusted by a different amount. The error may not be identified and thus the data record may continue to be adjusted in error. The error may continue until the user associated with the data record identifies the error and informs the financial institution of the error.

The second server computer system 120 determines whether or not a function has been performed by the first server computer system 110 in error. Specifically, during method 400, the data corruption detection module determines whether the function performed in association with the data record was performed according to a defined rule (step 420).

In this embodiment, the data corruption detection module determines whether the function performed in association with the data record was performed according to a defined rule. The determination is made after the function has already been performed on the data record. In this embodiment, there may be a time delay between when the function is performed in associated with the data record (by the function-performing module) and when the data corruption detection module determines whether the function was performed according to a defined rule. The time delay may be, for example, one or more days, one or more business days, one or more weeks, etc.

In this embodiment, the second server computer system 120 may receive data from the first server computer system 110 including functions performed on data records by the function-performing module. The data may include an identifier for the data records and functions performed in association with each data record.

For a particular data record, the second server computer system 120 may analyze the received data to identify one or more rules based on the function performed in association with the data record.

In this embodiment, the identified one or more rules based on the function performed in association with the data record are compared to the defined rules associated with the data record. When the identified one or more rules match at least one of the defined rules associated with the data record, the data corruption detection module determines that there are no errors and thus no further action is required.

Responsive to determining that the function was not performed according to a defined rule, the data corruption detection module generates a notification indicating data corruption and identifying the data record (step 430). The data corruption detection module may indicate an error in the processor-executable instructions of the function-performing module.

In this embodiment, when the identified one or more rules do not match at least one of the defined rules associated with the data record, the data corruption detection module determines that the function was not performed according to the one or more defined rules associated with the data record and that this indicates data corruption.

A notification is generated by the data corruption detection module. The notification may be sent as a signal to the first server computer system 110, the signal causing the first server computer system 110 to display the notification indicating data corruption. The notification may include identifying information of the data record and information regarding the error.

The data corruption detection module may correct the rule applied to the data record to ensure it is in-line with the defined rule associated with the data record. For example, the data corruption detection module may send a signal to the function-performing module, the signal including the defined rule associated with the data record and causing the function-performing module to associate the defined rule with the data record. In this manner, the detected data corruption may be automatically corrected by the data corruption detection module.

As mentioned, in embodiments the function associated with the data record may include adjusting a value of the data record. During step 420, responsive to determining that the function was not performed according to the defined rule, the value of the data record may be adjusted by an amount equal to an amount adjusted by the function-performing module. In this manner, the amount of value adjusted by the function-performing module is negated or otherwise corrected by the data-correction checking module.

In manners described above, the system 100 may be used to detect data corruption associated with automated functions performed by the function-performing module.

Examples of data corruption detection will now be described. The examples may be performed in accordance with the methods and systems described herein.

In an example, a data record may be associated with a defined rule indicating that the account associated with the data record does not have a monthly fee. The function-performing module may perform a function on the data record which may include applying an input/output modifier in an amount of $10 at a frequency of one-month. After the input/output modifier is applied to the data record, the data corruption detection module may receive data indicating functions performed in association with the data record. The data corruption detection module may identify that a monthly fee of $10 was applied to the data record. The data corruption detection module may compare the identified rule that was applied to the data record (applying a $10 monthly fee) to the defined rule associated with the data record (no monthly fee) and thus determines that the function was not performed according to defined rule. The data corruption detection module may generate a notification indicating data corruption and identifying the data record. The data corruption detection module may also correct the error by adjusting the value of the data record by $10 or may send a signal to the function-performing module causing the function-performing module to correct the error. The data corruption detection module may also correct the rule applied to the data record to ensure it is in-line with the defined rule associated with the data record.

In another example, a data record may be associated with a defined rule indicating that an account associated with the data record is required to receive a monthly statement. The data corruption detection module may receive data indicating functions performed in association with the data record and may determine that no statement has been generated for the account associated with the data record in the last thirty (30) days. Put another way, the data corruption detection module may compare data indicating functions performed in associated with the data record to the defined rule associated with the data record (generate a monthly statement) and thus may determine that a function has not been performed according to the defined rule. The data corruption detection module may generate a notification indicating data corruption and identifying the data record. The data corruption detection module may also correct the error by generating a monthly statement or may send a signal to the function-performing module causing the function-performing module to generate a monthly statement. The data corruption detection module may also correct the rule applied to the data record to ensure it is in-line with the defined rule associated with the data record.

In yet another example, a data record may be associated with a defined rule indicating an interest rate to be charged to a value stored in the data record. The value stored in the data record may be, for example, a mortgage amount. The function performing module may perform a function on the data record which may include charging interest on the value of the data record. After the interest is charged on the value of the data record, the data corruption detection module may receive data indicating functions performed in association with the data record. The data corruption detection module may identify that interest was charged to the value of the data record at a rate of 2.5%. The data corruption detection module may compare the identified rule that was applied to the data record (charging 2.5% interest) to the defined rule associated with the data record (charging prime minus 0.5% interest) and thus determines that the function was not performed according to defined rule. The data corruption detection module may generate a notification indicating data corruption and identifying the data record. The data corruption detection module may also correct the error by adjusting the amount of interest charged or may send a signal to the function-performing module causing the function-performing module to correct the error. The data corruption detection module may also correct the rule applied to the data record to ensure it is in-line with the defined rule associated with the data record.

In still yet another example, a data record may be associated with a defined rule indicating that an input/output modifier is to be applied to the value of the data record in the event that the value of the data record is below zero. The function-performing module may perform a function on the data record which may include applying an input/output modifier to the data record when the value is zero. After the input/output modifier is applied to the data record, the data corruption detection module may receive data indicating functions performed in association with the data record. The data corruption detection module may identify that an input/output modifier was applied to the data record as a result of the value of the data record being equal to zero. The data corruption detection module may compare the identified rule that was applied to the data record (applying an input/output modifier when the value of the data record is zero) to the defined rule associated with the data record (applying an input/output modifier when the value of the data record is below zero) and thus determines that the function was not performed according to defined rule. The data corruption detection module may generate a notification indicating data corruption and identifying the data record. The data corruption detection module may also correct the error by adjusting the value of the data record by value of the input/output modifier or may send a signal to the function-performing module causing the function-performing module to correct the error. The data corruption detection module may also correct the rule applied to the data record to ensure it is in-line with the defined rule associated with the data record.

It will be appreciated that in embodiments the one or more defined rules described herein may be based on, for example, regulatory rules, contractual terms, business intent rules, etc. Regulatory rules include rules that the financial institution associated with the financial institution server may be required, by law, to comply with. Contractual terms include rules that the financial institution has agreed to follow in a contract with a customer. Business intent rules include rules that the financial institution intends to follow even though they may not be required to follow these rules by law.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A system comprising:
   at least one processor; and
   at least one memory device coupled to the at least one processor and storing a data corruption detection module, the data corruption detection module comprising processor-executable instructions which, when executed by the at least one processor, configure the at least one processor to:
   determine that a function performed by a function-performing module was not performed according to a defined rule; and
   responsive to determining that the function was not performed according to the defined rule, generate a notification indicating data corruption,
   the data corruption detection module and the function-performing module configured separately and in a blind manner.

2. The system of claim 1, wherein the function-performing module comprises processor-executable instructions which, when executed by the at least one processor, configure the at least one processor to perform the function.

3. The system of claim 1, wherein the at least one processor is associated with a single server computer system and the data corruption detection module and the function-performing module are executed by the at least one processor associated with the single server computer system.

4. The system of claim 1, wherein the function-performing module comprises processor-executable instructions which, when executed by at least one other processor, configure the at least one other processor to perform the function.

5. The system of claim 4, wherein the at least one processor is associated with a first server computer system and the at least one other processor is associated with a second server computer system.

6. The system of claim 1, wherein the data corruption indicates an error in processor-executable instructions of the function-performing module.

7. The system of claim 1, wherein the function performed by the function-performing module includes a function associated with one or more data records.

8. The system of claim 7, wherein the function associated with the one or more data records includes adjusting a value of the one or more data records.

9. The system of claim 8, wherein the data corruption detection module further comprises processor-executable instructions which, when executed by the at least one processor, further configure the at least one processor to:
   responsive to determining that the function was not performed according to the defined rule, adjust the value of the one or more data records by an amount equal to an amount adjusted by the function-performing module.

10. The system of claim 7, wherein the one or more data records are associated with one or more defined rules, the one or more defined rules including the defined rule.

11. The system of claim 1, wherein the data corruption detection module further comprises processor-executable instructions which, when executed by the at least one processor, further configure the at least one processor to:
   identify a rule based on the function performed;
   wherein determining that the function was not performed according to the defined rule includes determining that the identified rule is not one of one or more defined rules.

12. A computer-implemented method performed by a data corruption detection module that comprises processor-executable instructions executed by at least one processor to perform the computer-implemented method, the computer-implemented method comprising:
   determining that a function performed by a function-performing module was not performed according to a defined rule; and
   responsive to determining that the function was not performed according to the defined rule, generating a notification indicating data corruption,
   the data corruption detection module and the function-performing module configured separately and in a blind manner.

13. The computer-implemented method of claim 12, wherein the function-performing module comprises processor-executable instructions executed by the at least one processor to perform the function.

14. The computer-implemented method of claim 12, wherein the at least one processor is associated with a single server computer system and the data corruption detection module and the function-performing module are executed by the at least one processor associated with the single server computer system.

15. The computer-implemented method of claim 12, wherein the function-performing module comprises processor-executable instructions executed by at least one other processor to perform the function.

16. The computer-implemented method of claim 15, wherein the at least one processor is associated with a first server computer system and the at least one other processor is associated with a second server computer system.

17. The computer-implemented method of claim 12, wherein the data corruption indicates an error in processor-executable instructions of the function-performing module.

18. The computer-implemented method of claim 12, wherein the function performed by the function-performing module includes a function associated with one or more data records.

19. The computer-implemented method of claim 18, wherein the function associated with the one or more data records includes adjusting a value of the one or more data records.

20. At least one non-transitory computer readable storage medium comprising processor-executable instructions which, when executed, configure at least one processor to:
   determine, via a data corruption detection module, that a function performed by a function-performing module was not performed according to a defined rule; and
   responsive to determining that the function was not performed according to the defined rule, generate a notification indicating data corruption,
   the data corruption detection module and the function-performing module configured separately and in a blind manner.

* * * * *